Figure 1:
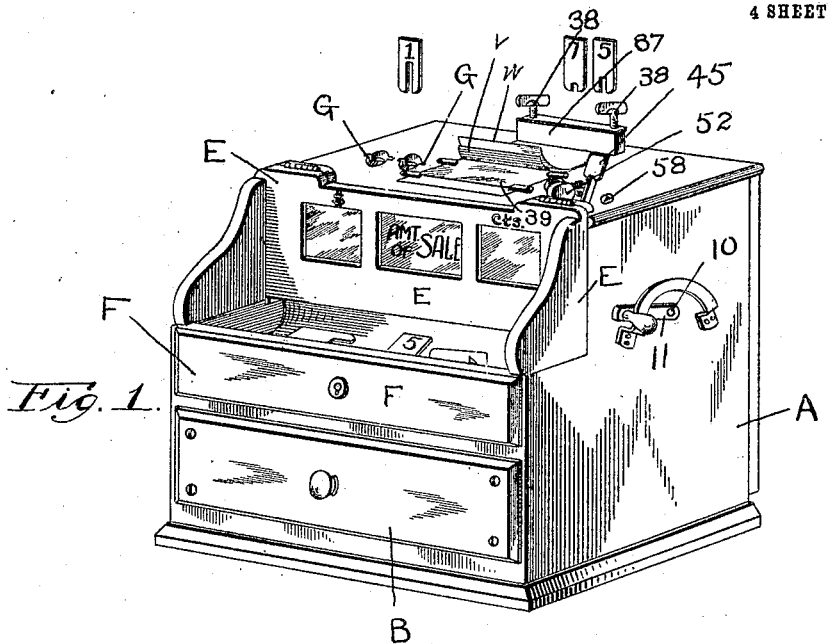

No. 835,348. PATENTED NOV. 6, 1906.
T. H. BLAIR.
CASH REGISTER.
APPLICATION FILED DEC. 17, 1900.

4 SHEETS—SHEET 1.

Witnesses
C. F. Wesson
M. E. Regan

Inventor
T. H. Blair
By
Southgate & Southgate
Attorneys

THE NORRIS PETERS CO., WASHINGTON, D. C.

No. 835,348. PATENTED NOV. 6, 1906.
T. H. BLAIR.
CASH REGISTER.
APPLICATION FILED DEC. 17, 1900.

4 SHEETS—SHEET 2.

Witnesses
C. F. Wesson
M. E. Regan

Inventor
T. H. Blair
By
Southgate & Southgate
Attorneys

No. 835,348. PATENTED NOV. 6, 1906.
T. H. BLAIR.
CASH REGISTER.
APPLICATION FILED DEC. 17, 1900.

4 SHEETS—SHEET 3.

Witnesses
C. F. Wesson.
M. C. Regan.

Inventor.
T. H. Blair.
By
Southgate & Southgate
attorneys.

No. 835,348. PATENTED NOV. 6, 1906.
T. H. BLAIR.
CASH REGISTER.
APPLICATION FILED DEC. 17, 1900.
4 SHEETS—SHEET 4.
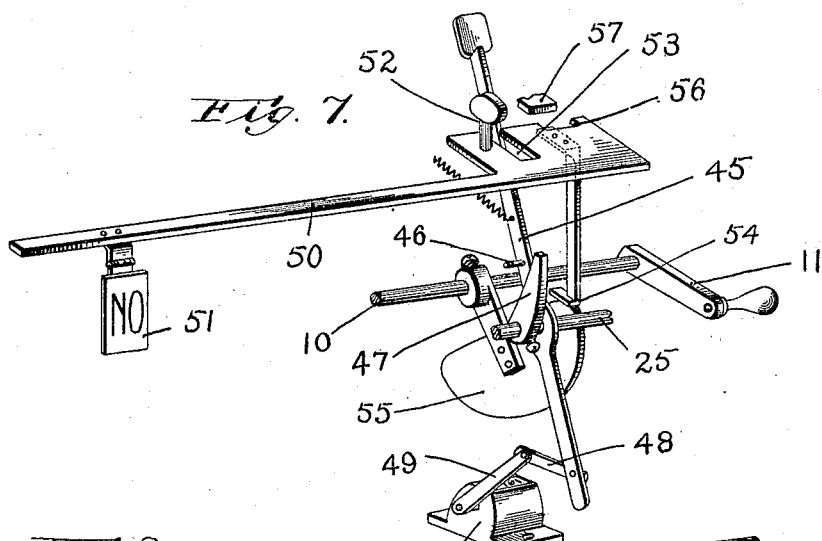
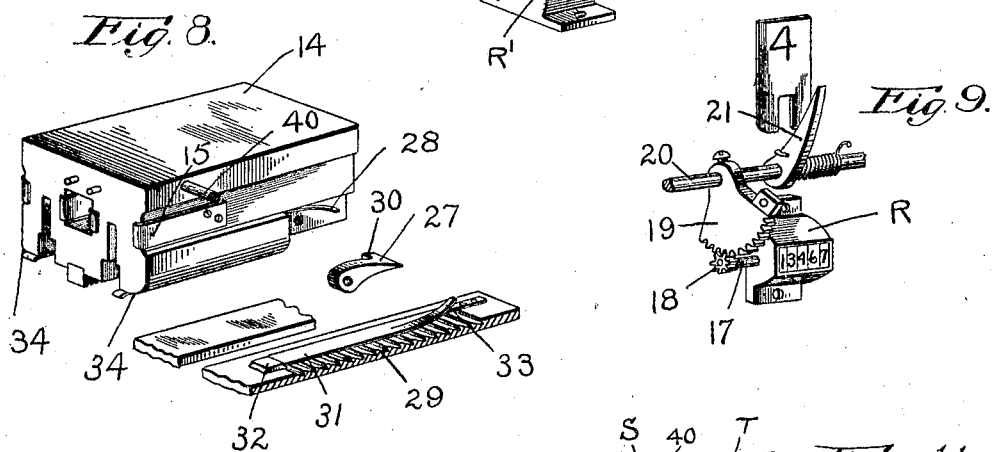
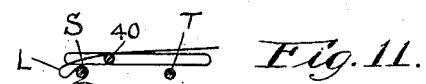
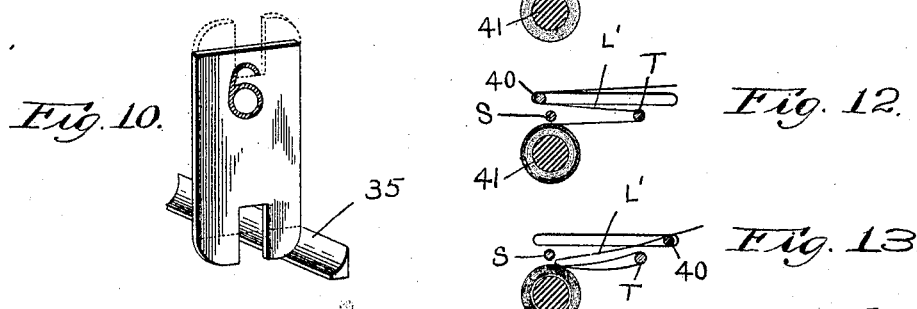
Witnesses
C. F. Werson
M. E. Regan
Inventor
T. H. BLAIR
By
Southgate & Southgate
Attorneys

UNITED STATES PATENT OFFICE.

THOMAS H. BLAIR, OF NORTHBORO, MASSACHUSETTS, ASSIGNOR TO WHITING MANUFACTURING COMPANY, OF NORTHBORO, MASSACHUSETTS, A CORPORATION OF MASSACHUSETTS.

CASH-REGISTER.

No. 835,348.  Specification of Letters Patent.  Patented Nov. 6, 1906.

Application filed December 17, 1900. Serial No. 40,081.

*To all whom it may concern:*

Be it known that I, THOMAS H. BLAIR, a citizen of the United States, residing at Northboro, in the county of Worcester and State of Massachusetts, have invented a new and useful Cash-Register, of which the following is a specification.

This invention relates especially to that class of cash-registers in which transactions are registered by means of separate checks, which are exposed to view for the purpose of exhibiting the amount of the transaction registered.

The primary object of this invention is to provide an automatically-registering check-operated cash-register which will automatically add together amounts designated by independent checks which are successively inserted into the machine to keep a record of the total amount of transactions represented by said successive checks—that is to say, the primary object of this invention is to provide a check-operated cash-register which is equally automatic in action and which will make an equally accurate record of the total amount of transactions as the more complicated and expensive cash-registers which are controlled by keyboards instead of being controlled by independent checks.

In addition to constructing a check-operated cash-register so that the same will be equally automatic with other forms of cash-registers a secondary or further object of this invention is to provide a cash-register which will not only keep a record of the total amount of transactions, but which is also provided with a paper winding or reeling device, providing a band or strip upon which a note of each transaction should be written by the person operating the machine, which band or strip is automatically fed or advanced at each recording operation of the cash-register, so that the amount of sales and character thereof can be checked or verified, not only by the amounts indicated by the registering and adding mechanisms of the cash-register, but also by the detail memoranda or notes which are made upon the memorandum-band.

To accomplish these results and to provide a form of cash-register which may be locked up and rendered inoperative when desired and which is provided with safety devices for preventing the same from being improperly operated, this invention consists of the parts and combinations of parts, as hereinafter described, and more particularly pointed out in the claims at the end of this specification.

Figure 2:
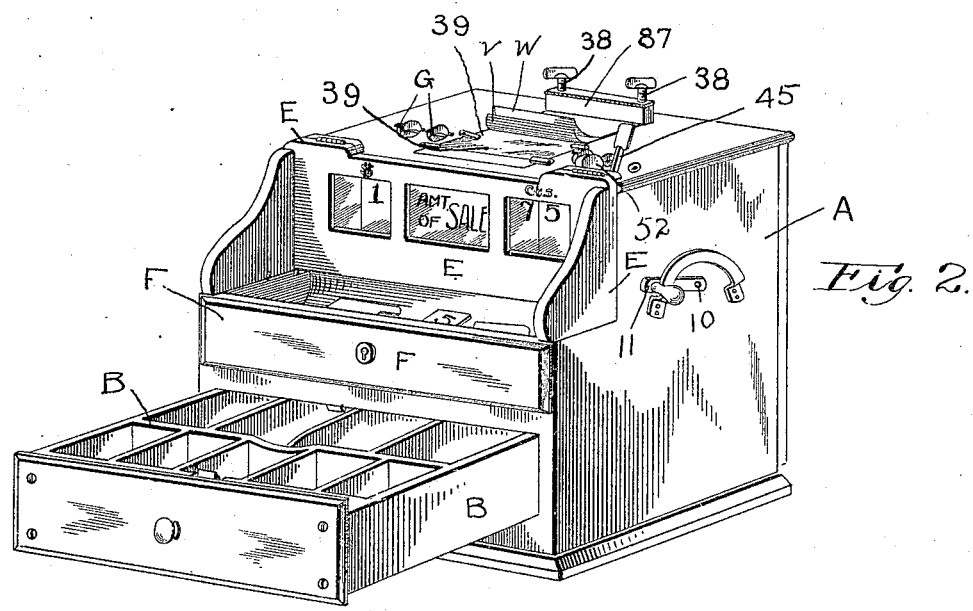
Figure 3:
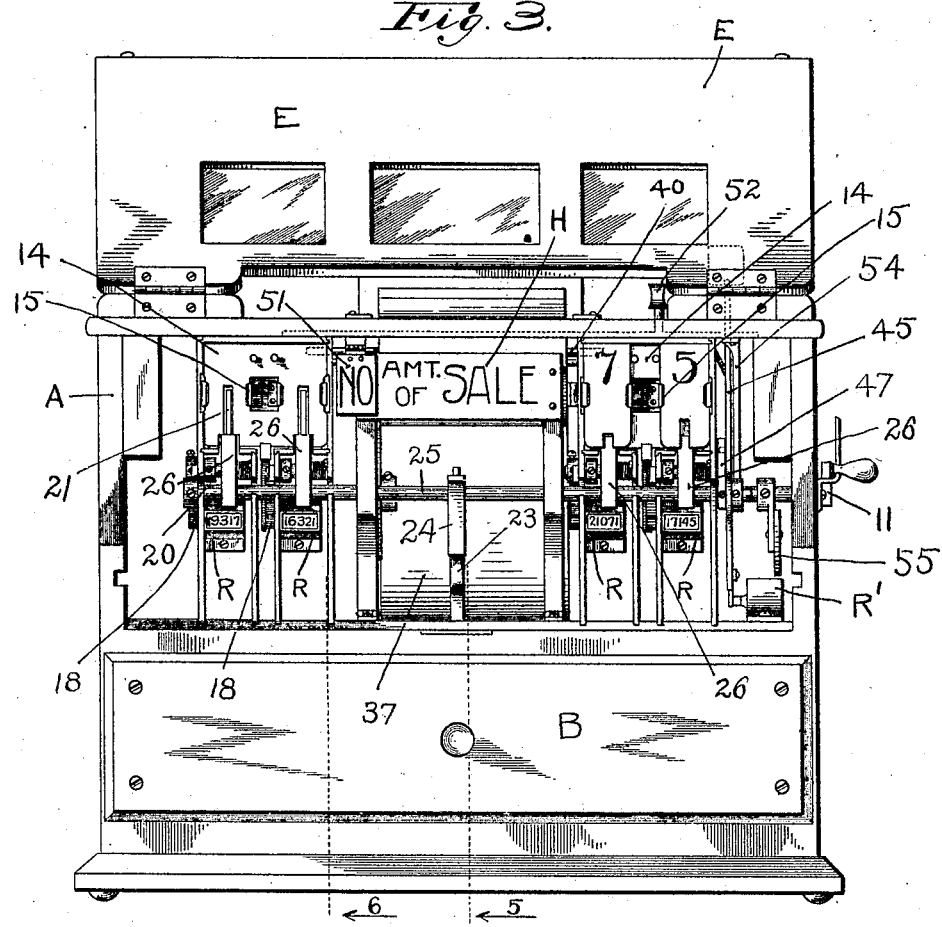
Figure 4:
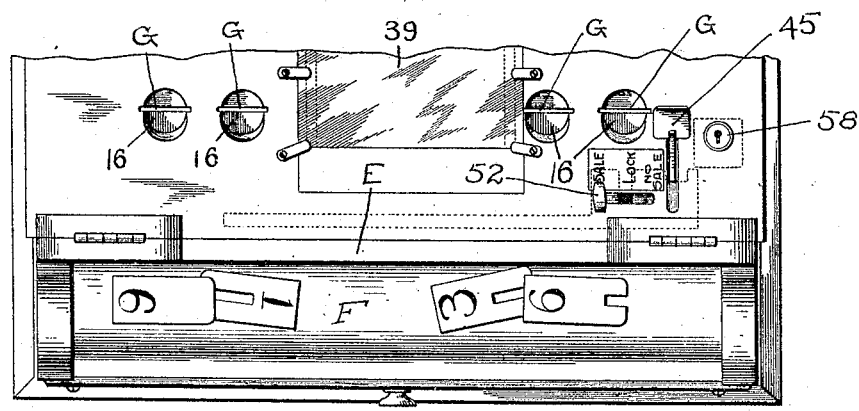
Figure 5:
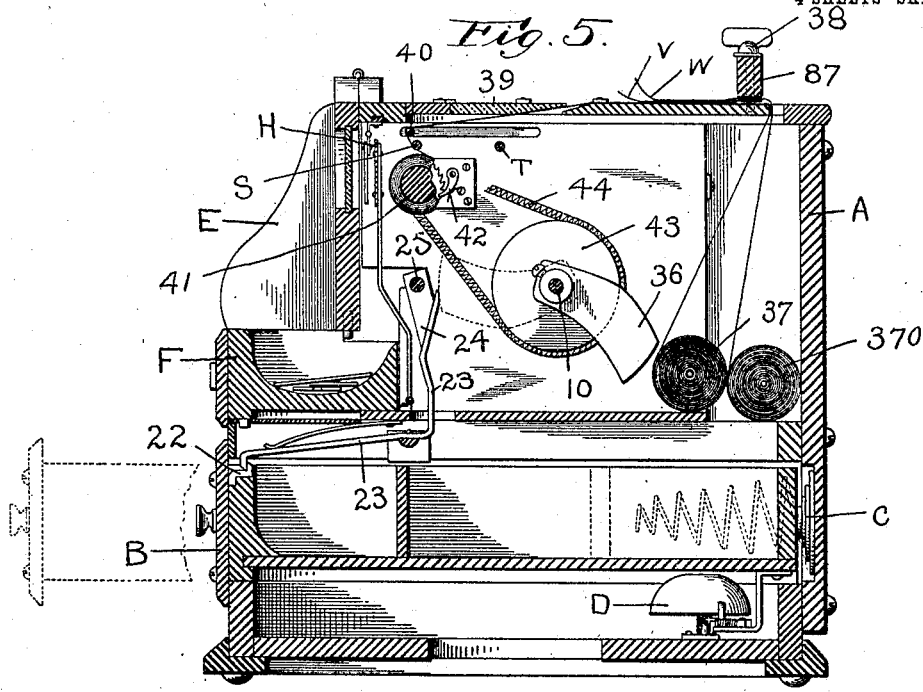
Figure 6:
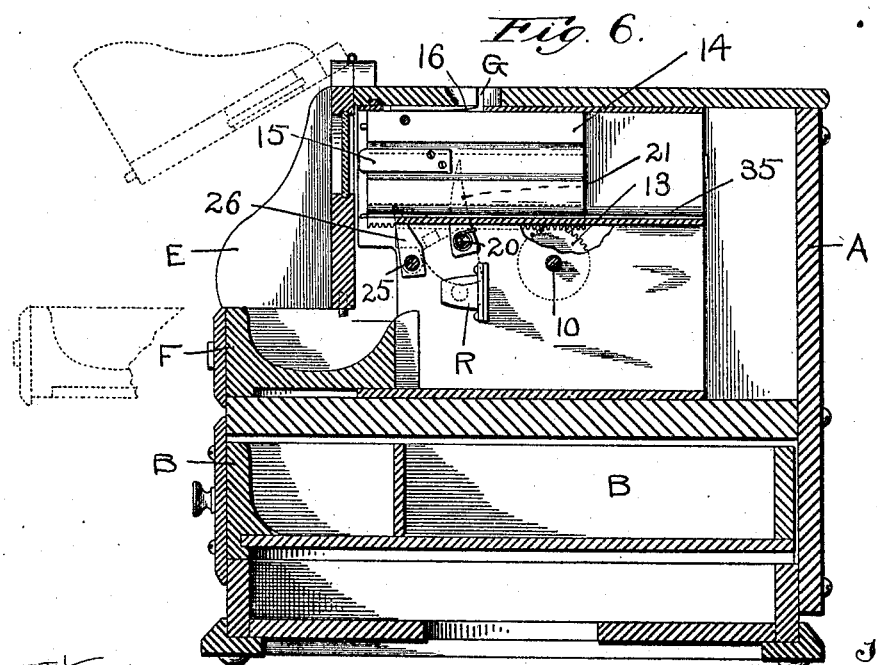

In the accompanying four sheets of drawings, Figure 1 is a perspective view of a cash-register constructed according to this invention, showing the manner in which the checks are inserted into the machine. Fig. 2 is a similar view illustrating the position of the parts when the checks are moved forward to expose them to view and unlock the cash-drawer. Fig. 3 is an enlarged front view of the machine, having the hinged front thereof turned up to expose the main operative parts of the register. Fig. 4 is a fragmentary plan view of the machine. Fig. 5 is a transverse sectional view thereof, taken on the line 5 of Fig. 3. Fig. 6 is a sectional view taken on the line 6 of Fig. 3. Fig. 7 is a fragmentary perspective view of the no-sale key and of the slide which controls the same or locks the machine to render it inoperative when desired. Fig. 8 is a fragmentary perspective view illustrating the ratchet mechanism for preventing the check-carrier from being reversed before it has moved to the extreme limit of its forward travel. Fig. 9 is a fragmentary perspective view illustrating one of the checks and the registering mechanism controlled thereby. Fig. 10 is a perspective view illustrating the construction for preventing a check from being inserted into the machine in an inverted or upside-down position; and Figs. 11 to 13, inclusive, are diagrammatic views illustrating the operation of the parts for slacking off or unwinding the memorandum-strip.

Referring to the accompanying drawings and in detail, the cash-register herein illustrated comprises a casing or frame A, and mounted in the lower part of the casing A is a cash-drawer B. As shown in Fig. 5, the cash-drawer B is provided with a coiled spring C, normally tending to open the same, and below the cash-drawer B is a bell D, which is sounded by any of the usual connections as the cash-drawer flies open. The casing A is provided with a hinged front E, having glazed openings therein for exposing the checks to view for the purpose of exhibiting the amounts of the successive transactions as they are registered. The hinged front E may be held down in place by a removable drawer or trough F, said parts being arranged so that by locking the drawer or trough F no access can be had to the inside of the machine, while by removing said drawer or trough F the front of the machine may be turned up, as illustrated in Fig. 3, to permit the operative parts to be inspected and the amounts indicated by the adding devices determined and compared in the ordinary manner. Opening into the upper part of the casing A are a number of check-receiving guideways G. As illustrated most clearly in Fig. 6, each of the check-receiving guideways G is preferably cut out in the form of a finger-hole and is provided with an inclined front edge or cam-plate 16, arranged so that each check passing forward under said cam-plate will be forced down into the proper position in its check-carrier.

The operative parts of the cash-register herein illustrated comprise a main operating-shaft 10, which may be turned or oscillated by a handle 11 at the side of the machine. As illustrated in Fig. 6, the main shaft 10 is provided with gears 13, which mesh with and engage racks extending down from blocks 14, which constitute the check-carrier for carrying the checks forward from the position in which they are inserted into the check-guideways G to position exposing them to view at the front of the machine for the purpose of exhibiting the amount of the transaction registered. Each of the blocks 14 is provided with one or more sets of spring-fingers 15 for holding the checks in position at the front end thereof. The blocks 14 are preferably rounded or chamfered at their lower corners, as indicated at 34 in Fig. 8, and the cells or ways in which said blocks 14 are mounted are provided with corresponding filled-in or solid corners, as indicated at 35 in Fig. 10. The form of check preferably employed is also most clearly illustrated in Fig. 10. As shown in this figure, each check is preferably chamfered or made narrower at its lower end, so that the strip or filled-in corner 35 will prevent a check from being inserted into the machine in an inverted or upside-down position, as indicated by dotted lines. The checks designating various amounts are slotted at their bottoms to different depths or otherwise notched, checks indicating smaller amounts having notches or slots which are longer than checks designating larger amounts. As the checks are carried by the check-carrier each check will actuate a small adding or registering mechanism R. The adding or registering mechanisms R may be of any of the ordinary or preferred constructions, which need not be herein illustrated or described at length. The connections for operating said registers by means of a check are most clearly illustrated in Fig. 9. As shown in this figure, a shaft 17 extends from a register R and is provided at its end with a pinion 18, meshing with a sector 19, which is secured on a spring-pressed rock-shaft 20. Extending up into the path of a check from the rock-shaft 20 is a finger or arm 21, said parts being arranged so that the extent to which the arm 21 will be turned or rocked, and hence the extent to which the register R will be actuated, will vary according to the depth of the notch or recess in the bottom of the check. As a check continues to move forward after it has operated its registering mechanism it will next act to release the cash-drawer, so as to permit the same to fly open. The connections employed for this purpose are most clearly illustrated in Figs. 5 and 6. As shown in these figures, the cash-drawer B is provided at its front with a detent or catch 22, which is normally engaged by a bell-crank or L-shaped spring-catch 23. The upright leg of the spring-catch 23 extends up in position to be engaged by an operating-arm 24, extending down from a rock-shaft 25. The rock-shaft 25 is provided with a number of operating-sections or fingers 26, which extend up into the path of the checks, the fingers 26 being also preferably arranged to engage the rear faces of the checks, and when the check-carrier is again moved back the fingers 26 will act as strippers for releasing the checks from the springs or clips 15, permitting the checks to drop down into the drawer or trough F at the front of the machine from which they may be picked up and used again as soon as desired.

The ratchet mechanism for preventing the machine from being improperly operated by reversing the check-carrier before the same has been moved to the forward end of its travel is most clearly illustrated in Fig. 8. As shown in this figure, one block 14 of the check-carrier is provided with a pawl 27, having a spring 28 engaging the same. While the check-carrier is moving forward the pawl 27 engages ratchet-teeth 29 and is held down into mesh therewith by a spring-plate 31, which rests upon and bears on a finger 30 at one side of the pawl 27, while the check-carrier is moving forward. The spring-plate 31 is fastened or riveted in place only at its rear end. When the check-carrier reaches the forward end of its travel, the finger 30 rides up over a cam or lug 32 and passes out from under the spring-plate 31, so that the check-carrier can then be reversed, the finger 30 then riding on top of the spring-plate 31, which now serves as a guide to hold the pawl up out of engagement with the ratchet-teeth until the check-carrier is moved back to its check-receiving position, so that when the check-carrier is again moved forward the finger 30 will pass under a turned-up guide 33 of the spring-plate 31, repeating the operation just described. When the blocks 14 are in their forward or check-exposing position, they will close the check-receiving guideways G, preventing any instrument from being inserted therein to open the cash-drawer.

In the use of this form of cash-register it has sometimes been objected that when the check-carrier is in its retracted or check-receiving position the check-receiving guideways are then open, so that some instrument might be inserted to release the cash-drawer without the use of a check. To prevent this from happening, the main operating-shaft of the machine is preferably provided with a locking-arm or sector 36, as shown most clearly in Fig. 5, which will turn to the position indicated by dotted lines when the check-carrier is retracted and will engage behind the spring-catch 23, so as to fasten this catch and prevent the same from being released at this time.

By means of the construction thus far described in detail an accurate record will be automatically kept of the amounts designated by the checks successively inserted into the machine, and the checks themselves will be used, first, to operate the adding devices; second, to release the cash-drawer, and, third, to exhibit the amounts of the successive transactions as they are registered. In addition to a record of this kind in some places it is desirable to keep a note or memorandum of the character of each sale. To permit this to be done, a machine constructed according to this invention may be provided with paper winding or reeling devices, and such a construction is illustrated in Fig. 5. As shown in this figure, 37 designates a supply roll or spool, which may be loosely supported or journaled in the machine in any desired manner. From the spool 37 a strip of paper passes up through a slot in the top of the casing A, thence under a guide bar or tension-strip 87, which acts as a brake to prevent the paper from being wound up by the reeling devices, hereinafter referred to, except such part thereof as shall have been positively slacked or drawn up from the roll 37 under the guide or tension bar 87. The bar 87 is held in place and may be adjusted by screws 38. The paper band or strip passes down through a slot in the casing and preferably passes under a glass plate 39, through which the memoranda or notes written thereon can be read after having been moved forward, but before the strip is wound or reeled up onto the winding-spool 41. The construction employed for positively drawing or unwinding the paper from the supply-spool 37 consists of two or more guide rolls or rods S and T, secured in the casing of the machine, and a traveling looper or rod 40, carried by the check-carrier. Secured on the main shaft 10 is a grooved pulley 43, and passing around the grooved pulley 43 and the winding-up spool 41 is a friction belt or band 44, the friction-band 44 being preferably formed by a coiled wire spring. A ratchet and pawl 42 prevent the winding-up roll 41 from turning backward, and the tension of the friction-belt 44 is regulated so as to be sufficient to wind up the loose paper which is slacked off or drawn from the supply-spool 37, after which the belt or friction-band 44 will slip upon its pulleys without exerting sufficient pull to draw the paper from its supply-spool 37. The guide rods or rolls S and T and the looper or rod 40 are preferably arranged so that by leading the paper around the same in different directions the amount of paper drawn from the roll and used at each operation of the machine may be varied. The operation of these parts is most clearly illustrated in Figs. 11, 12, and 13. As shown in Fig. 11, if the paper after passing around the looper or rod 40 is carried around the rod or roll S, and thence to the winding-up roll 41, a comparatively short loop L will be slacked or drawn off when the check-carrier moves forward, while if the paper after passing around the looper 40 is carried around the rod or guide T, as illustrated in Fig. 12, a considerably longer loop L' of paper will be drawn forward. By increasing the number of rods or guides employed still further variations may be made in the amount of paper which is slacked off or drawn from the supply-roll by the looper 40 to be subsequently wound up by the frictional winding mechanism referred to. In connection with this memorandum band or strip a cash-register constructed according to this invention may, if desired, be provided with a second paper roll, from which bills or invoices may be torn and given to the purchaser, if desired.

Referring to Fig. 5, the machine, as herein illustrated, is provided with a second supply-spool or paper roll 370, from which the strip of paper W may be led under the rod or bar 87, so that the end thereof will lie on top of the memorandum band or strip. Interposed between the paper or strip W, which is to be torn off and given to the customer, and the memorandum-band is a piece of carbon or transfer paper, which is so arranged that it will reproduce upon the memorandum-strip the items or notes which are written on the bill or paper W, which can then be torn off and given to the customer, so that by means of this construction a cash-register will be provided which will keep an autographic record of the bills or purchase-slips given to the customer.

To permit the machine to be operated when no sale is to be registered, the machine may, if desired, be provided with no-sale checks of suitable construction to simply operate the drawer-releasing connections without operating the registering or adding mechanisms. When a machine constructed according to this invention is provided with a memorandum-band or paper-winding mechanism or when it is desired to know how often the cash-drawer has been opened without recording a sale, it is not usually desirable to use no-sale checks, as the use of such checks will leave no record, except blank spaces on the paper-strip, and on this account it is preferable to provide the cash-register with a no-sale key, having a separate register or counter for indicating the number of times the no-sale key is operated to open the machine without registering a sale or transaction. The specific form of no-sale key which is preferably employed is most clearly illustrated in Fig. 7 As shown in this figure, a key or lever 45, normally drawn back by a spring, is provided with a pin or finger 46 for engaging an operating arm or finger 47, extending up from the drawer-releasing rock-shaft 25, before referred to, so that by moving the key or lever 45 forward the cash-drawer will be released without operating the check-carrier. At its lower end the no-sale key or lever 45 is connected by links 48 and 49 to operate a register or counter R', which registers the number of times the no-sale key is actuated. The operation of the no-sale key 45 is preferably controlled by a transverse slide 50, carrying a conspicuous sign 51 for indicating to a purchaser or one watching the operation of the machine that no sale is being recorded. The signal or sign 51, which is carried by the slide 50, is arranged in front of a hinged signboard H, which has printed thereon in abbreviated form the words "amount of sale," which, when the sign 51 is moved to the right, will read "no sale." Referring again to Fig. 7, the slide 50 is provided with an operating-handle or finger-piece 52 and with a slot 53, which will receive the no-sale key when the slide slide 50 is moved in position to permit the said key to be operated. In addition to controlling the operation of the no-sale key the slide 50 is also preferably provided with an attachment for controlling the operation of the check-carrier and is also arranged to coöperate with a lock when it is desired to lock up the machine to prevent the operation either of the no-sale key or check-carrier. To control the operation of the check-carrier, the slide 50 is provided with a downwardly-extending projection or finger 54, which is arranged to engage above a plate 55, carried by a finger extending from the main operating-shaft 10 of the machine. By means of this construction when the finger-piece 52 is moved to its extreme position to the left, as indicated in Fig. 4, the main operating-shaft, and hence the check-carrier, will be left free to operate, while when the finger-piece 52 is moved to its limit of travel to the right the check-carrier may be locked or held from moving, and the no-sale key will be left free to be operated. While if the finger-piece 52 is set to an intermediate or central position both the no-sale key and the check-carrier will be prevented from being operated, and by locking the slide 50 by means of a bolt 57, controlled by an ordinary lock 58, any operation of the machine whatever will be absolutely prevented.

The operation of the various parts of the machine have been so fully described in describing their construction that a description of the operation of the machine as a whole is believed to be unnecessary.

In this application for patent I do not intend to claim broadly the form of check-carrier which I have herein shown and described, as in a previous United States Patent No. 676,216, granted to me June 11, 1901, I have shown a construction employing a similar check-carrier in a check-controlled register which does not automatically add the amounts indicated by the checks, the especial object of this invention, so far as the operating mechanism of the cash-register is concerned, being to render the machine as nearly automatic as possible by providing a check-operated cash-register which will expose the checks to view to exhibit the amounts of transactions registered and which will automatically add together the amounts of successive transactions.

Many changes may be made in the construction of cash-registers by those who are skilled in the art and various features of the machine herein described may be omitted or used in different relations without departing from the scope of this invention as expressed in the claims. It is not desired, therefore, to be limited to the specific construction herein shown and described; but What it is desired to cover, and secure by Letters Patent of the United States, is—

1. In a cash-register, the combination of a check, a check-carrier for moving the checks from the position in which they are inserted into the machine to position exposing them to view for the purpose of exhibiting the amount of the transaction registered, an adding-register, and connections controlled by the checks for operating the adding-register, and for then releasing the cash-drawer, substantially as described.

2. In a cash-register, the combination of a check, a check-receiving guideway, a check-carrier for moving the checks from the position in which they are inserted into the machine to position exposing them to view, an adding-register, and operating connections therefor, comprising a finger extending up into the path of the checks as the same are moved by the check-carrier so as to be turned or moved different distances depending upon the configuration of successive checks, substantially as described.

3. In a cash-register, the combination of a check, a check-receiving guideway, a reciprocating or sliding check-carrier for carrying the checks from the position in which they are inserted into the machine to position exposing them to view, an operating-shaft and handle for reciprocating said check-carrier, an adding-register, a rock-shaft geared to operate said adding-register and an operating arm or finger extending up from said rock-shaft into the path traversed by the checks, and arranged to be moved different distances thereby depending on the configuration of said checks, or the depth to which the same are slotted, substantially as described.

4. In a cash-register, the combination of a check, a plurality of check-receiving guideways, a check-carrier for moving the checks from the position in which they are inserted into the machine to position exposing them to view, a cash-drawer, a spring-catch holding the cash-drawer in its locked or closed position, a rock-shaft connected to operate said catch, and a plurality of arms or fingers extending from said rock-shaft into the paths of the checks, substantially as described.

5. In a cash-register, the combination of a plurality of check-receiving guideways, a sliding check-carrier having spring-clips for receiving the checks, connections for actuating the check-carrier to carry the checks from the position in which they are inserted into the machine to position exposing them to view, a cash-drawer, a spring-catch for locking the cash-drawer, a rock-shaft connected to release the spring-catch, and a plurality of arms or fingers extending from the rock-shaft into the paths of the checks so as to be operated by the checks, and to then engage behind the checks and act as strippers for releasing the checks from the check-carrier when the same is moved back to its check-receiving position, substantially as described.

6. As articles of manufacture, a series of checks for operating cash-registers having slots in their lower ends varying in length with the values designated by said checks, and having rounded or chamfered lower corners coöperating with pieces or abutments in a receiving-slot for preventing said checks from being inserted into a cash-register in an inverted or upside-down position, substantially as described.

7. In a cash-register, the combination of a check, a check-receiving guideway having a finger-socket containing an inclined metallic plate, and a sliding check-carrier coöperating with said guideway, said parts being arranged so that the cam-plate will act to seat each check completely within the check-carrier as it is moved forward by the check-carrier to expose the same to view, substantially as described.

8. In a cash-register, the combination of a guideway, a sliding carrier, a pawl carried thereby, and a spring-plate fastened or riveted in place at one end so as to hold the pawl into mesh with ratchet-teeth when the carrier is moved in one direction, and permitting the carrier to pass from under the same when the carrier reaches the end of its travel, so as to be supported out of mesh with the ratchet-teeth when the carrier is moved back to its receiving position, substantially as described.

9. In a cash-register, the combination of a guideway, a sliding carrier, a cash-drawer, check-controlled cash-drawer-releasing connections, and means for locking the cash-drawer-releasing connections when the carrier is in its receiving position, substantially as described.

10. In a cash-register, the combination of checks, a check-receiving guideway, a sliding block forming a check-carrier which closes the check-receiving guideway except at a time when the check-carrier is in its check-receiving position, a cash-drawer, check-controlled releasing connections for the cash-drawer, and means for locking the cash-drawer-releasing connections when the check-carrier is in its check-receiving position, substantially as described.

11. The combination of a check, a check-controlled cash-register, comprising a check-receiving guideway in which the checks are first inserted, and are thereafter exposed to view for the purpose of exhibiting the amount of the transaction registered, a memorandum strip or band, and connections for automatically feeding or advancing the memorandum strip or band when the machine is actuated to register a transaction, substantially as described.

12. In a cash-register, the combination of checks, a check-receiving guideway, a check-carrier for moving the checks from the position in which they are inserted into the machine to position exposing them to view for the purpose of exhibiting the amount of the transaction registered, a memorandum band or strip, means for slacking or drawing the memorandum-strip from off of its supply-spool when the check-carrier is moved in one direction, and a frictional winding mechanism for winding up the memorandum-strip on a winding-spool when the check-carrier moves in the opposite direction, substantially as described.

13. In a cash-register, the combination of a guideway, a sliding carrier, a memorandum band or strip, guide rods or rolls, a looping rod or roll carried by the carrier and coöperating with the guide rods or rolls to slack off the desired length of paper from the supply-spool of the memorandum-strip when the carrier is moved in one direction, a winding-up spool, a ratchet mechanism for preventing the winding-up spool from turning backward, and a frictional driving-belt for turning the winding-spool to wind up the slackedoff paper when the carrier is moving back to its receiving position, substantially as described.

14. In a cash-register provided with a check-receiving guideway, in which the checks are first inserted, and are afterward exposed to view for the purpose of exhibiting the amount of the transaction registered, the combination of checks, an adding device, connections controlled by the checks successively inserted into the machine for operating the adding device, and for releasing the cash-drawer, and a no-sale key connected to release the cash-drawer without requiring the insertion of a check into the machine, or the operation of the adding device, substantially as described.

15. In a cash-register provided with a check-receiving guideway, in which the checks are inserted, and after which they are exposed to view for the purpose of exhibiting the amount of the transaction registered, the combination of checks, an adding device, connections controlled by the checks successively inserted into the machine for operating the adding device, and for releasing the cash-drawer, a no-sale key connected to release the cash-drawer without requiring the insertion of a check or the operation of the adding device, and a separate register or counter for keeping a record of the number of times the no-sale key is operated, substantially as described.

16. In a cash-register, the combination of a cash-drawer, a no-sale key for releasing the cash-drawer without registering a transaction, a signal, and means for preventing the operation of the no-sale key unless the signal is first set to indicate that the machine is in condition to be operated without registering a transaction, substantially as described.

17. In a cash-register, in which the transactions are registered by the insertion of checks into the machine, the combination of a cash-drawer, a no-sale key for releasing the cash-drawer without registering a transaction, and a single locking device for locking up the machine to prevent checks from being inserted therein, and at the same time prevent the operation of the no-sale key, substantially as described.

18. In a cash-register, the combination of checks, a check-receiving guideway, a check-carrier for moving the checks from the position in which they are inserted into the machine to position exposing them to view, a "no-sale" key for opening the cash-drawer, and a controlling connection or slide arranged to prevent the operation of the "no-sale" key when set to one position, and to prevent the operation of the check-carrier when set to another position, substantially as described.

19. In a cash-register, the combination of checks, a check-receiving guideway, a sliding check-carrier for moving the checks from the position in which they are inserted into the machine to position exposing them to view, a "no-sale" key connected to open the cash-drawer, a controlling connection or slide arranged to prevent the operation of the "no-sale" key when set to one position, to prevent the operation of the check-carrier when set to a second position, and to prevent the operation of either of said instrumentalities when set to a third position, and a lock for holding the controlling-slide in the last-named position so as to prevent the machine from being operated, substantially as described.

In testimony whereof I have hereunto set my hand in the presence of two subscribing witnesses.

THOMAS H. BLAIR.

Witnesses:
  LOUIS W. SOUTHGATE,
  PHILIP W. SOUTHGATE.